United States Patent [19]

Huarng et al.

[11] Patent Number: 5,932,353
[45] Date of Patent: Aug. 3, 1999

[54] RIGID THERMOPLASTIC ARTICLE HAVING SOFT COVERING

[75] Inventors: Roger Jyh-Chiarng R. Huarng, Northville; James M. Hurley, Grosse Ile, both of Mich.

[73] Assignee: BASF Corporation, Mt. Olive, N.J.

[21] Appl. No.: 08/994,785

[22] Filed: Dec. 19, 1997

[51] Int. Cl.$^6$ .............................. B32B 27/34; B32B 27/40
[52] U.S. Cl. ................................. 428/423.5; 428/423.1
[58] Field of Search ............................ 428/423.5, 423.1

[56] References Cited

U.S. PATENT DOCUMENTS

| | | | |
|---|---|---|---|
| Re. 28,688 | 1/1976 | Cook | 523/300 |
| 3,978,157 | 8/1976 | Bottenbruch et al. | 525/66 |
| 4,096,200 | 6/1978 | Lenz et al. | 525/66 |
| 4,179,479 | 12/1979 | Carter, Jr. et al. | 525/66 |
| 4,251,642 | 2/1981 | Tan et al. | 525/66 |
| 4,284,734 | 8/1981 | Chaney | 525/92 |
| 4,317,890 | 3/1982 | Goyert et al. | 525/66 |
| 4,500,671 | 2/1985 | Goyert et al. | 524/494 |
| 4,528,330 | 7/1985 | Kishida et al. | 525/85 |
| 4,762,884 | 8/1988 | Goyert et al. | 525/28 |
| 4,902,745 | 2/1990 | Piejko et al. | 525/80 |
| 5,049,614 | 9/1991 | Biglione | 525/85 |
| 5,055,525 | 10/1991 | Henton et al. | 525/66 |
| 5,216,062 | 6/1993 | Lausberg et al. | 524/404 |
| 5,219,933 | 6/1993 | Henton et al. | 525/66 |
| 5,237,000 | 8/1993 | Lausberg et al. | 525/64 |
| 5,237,001 | 8/1993 | Piejko et al. | 525/66 |
| 5,260,375 | 11/1993 | Lausberg et al. | 525/66 |
| 5,267,487 | 12/1993 | Falco et al. | 74/558 |
| 5,276,092 | 1/1994 | Kempner et al. | 525/84 |
| 5,346,954 | 9/1994 | Wu et al. | 525/85 |
| 5,434,219 | 7/1995 | Domura et al. | 525/84 |

FOREIGN PATENT DOCUMENTS 4211 335  10/1993  Germany .

OTHER PUBLICATIONS

Chemigum—Powdered Nitrile Elastomers, Product and Application Guide, Goodyear Chemical, Feb. 6, 1994.

*Primary Examiner*—D. S. Nakarani
*Attorney, Agent, or Firm*—James J. Drake

[57] ABSTRACT

The present invention provides a process for making articles of manufacture, as well as the articles themselves, comprising thermoplastic nylon materials and thermoplastic polyurethane blends capable of adhering to the thermoplastic nylon materials, wherein the thermoplastic polyurethane blends comprise:

a) 3 to 200 parts of a terpolymer of styrene/α-methylstyrene/acrylonitrile/$C_1$–$C_6$ alkyl acrylate with a glass transition temperature (Tg) below 0° C.;

b) 100 parts of a thermoplastic polyurethane produced from a diisocyanate, a $C_2$–$C_{10}$ diol, and a polyether and/or polyester-based polyol; and c) 0 to 50 parts of various additives including lubricants, pigments, stabilizers, etc. The articles of manufacture may be configured as power tool housings, luggage handles, gear shifts, automotive pedals, etc.

26 Claims, No Drawings

RIGID THERMOPLASTIC ARTICLE HAVING SOFT COVERING

1. FIELD OF THE INVENTION

The invention relates to composite articles including nylon materials which are adherent by themselves to a particular class of thermoplastic elastomers comprising thermoplastic polyurethanes.

2. BACKGROUND OF THE INVENTION

Rigid thermoplastics such as ABS, glass-filled nylon 6, and polycarbonate are used for a variety of engineering and/or structural applications such as power tool housings, luggage handles, gear shifts, automotive pedals, etc. For many of these applications, there is a need to cover over or adjoin these articles to a soft, elastomeric layer. This layer serves to provide a comfortable, ergonomic feel, reduced slippage, and increased abrasion resistance. Ideally, this combination of "hard" and "soft" materials is produced through a thermoforming operation such as co-injection molding, multi-layer extrusion, or blow molding.

U.S. Pat. No. 5,154,979 is directed to a shaped article and a method for making such an article. The article consists of a base made of a first thermoplastic polymer. An attachment made of a second thermoplastic polymer is welded on top of the base. One or both of the first polymer and second polymer must contain from 5 to 75 percent by weight, based on the mixture, of an olefin homopolymer and/or copolymer. Typical examples would include an engineering thermoplastic power tool body with a handle grip made of an elastomer such as TPU, Santoprene, or the like. Unfortunately, the article disclosed in the '979 patent provides insufficient abrasion resistance in the elastomeric portion as well as being too hard for most uses which would require an elastomeric overlay.

Until now, most thermoplastic elastomers with the required so fitness (Shore A≦80) to be useful as a soft covering, including propylene and ethylene-based EPDM polymers, styrenic block ter- or copolymers and plasticized PVC had insufficient adhesion to the rigid thermoplastic substrate unless affixed using separate adhesives or mechanical interlocking. Unfortunately, these soft TPEs also have ins efficient abrasion resistance for engineering applications. Although they have the desired Shore hardness, good adhesion and abrasion resistance, plasticized TPU (TPU blended with phthalate esters, such as DOP) is unacceptable due to the tendency of the plasticizer to migrate into the thermoplastic substrate and cause stress cracking, or to migrate into the thermoplastic/TPU interface, thus weakening adhesion.

3. SUMMARY OF THE INVENTION

The present invention provides a process for making articles of manufacture, as well as the articles themselves, comprising thermoplastic nylon materials and thermoplastic polyurethane blends capable of adhering to the thermoplastic nylon materials, wherein the thermoplastic polyurethane blends comprise:

a) 3 to 200 parts by weight of a terpolymer of styrene/α-methylstyrene/acrylonitrile/$C_1$–$C_6$ alkyl acrylate with a glass transition temperature (Tg) below 0° C.;

b) 100 parts by weight of a thermoplastic polyurethane produced from a diisocyanate, a $C_2$–$C_{10}$ diol, and a polyether and/or polyester-based polyol; and c) 0 to 50 parts by weight of various additives including lubricants, pigments, stabilizers, etc.

The articles of manufacture may be configured as power tool housings, luggage handles, gear shifts, automotive pedals, etc.

4. DESCRIPTION OF THE PREFERRED EMBODIMENTS

The article of the present invention is a combination of a rigid engineering thermoplastic, i.e., nylon, covered with a special TPU compound having a Shore A hardness≦90. This combination shows excellent adhesion and abrasion resistance and is easily produced by conventional thermoforming operations without the use of adhesives or mechanical interlocking.

The special TPU compound is based on:

a) 3 to 200 parts by weight of a terpolymer of styrene/α-methylstyrene/acrylonitrile/$C_1$–$C_6$ alkyl acrylate with a glass transition temperature (Tg) below 0° C.;

b) 100 parts by weight of a thermoplastic polyurethane produced from a diisocyanate, a $C_2$–$C_{10}$ diol, and a polyether and/or polyester-based polyol; and c) 0 to 50 parts by weight of various additives including lubricants, pigments, stabilizers, etc.

The resulting composition has a Shore A hardness≦90. The relative hardness of elastic materials such as rubber or soft plastics can be determined with an instrument called a Shore A durometer. If the indenter completely penetrates the sample, a reading of 0 is obtained, and if no penetration occurs, a reading of 100 results. The reading is dimensionless. The materials above are combined together in a melt process, preferably using a twin-screw extruder.

Optionally, one or more UV stabilizers, one or more compatibilizers, and one or more additives selected from the group consisting of lubricants, and inhibitors, stabilizers against hydrolysis, heat stabilizers, flame retardants, dyes, pigments, inorganic and/or organic fillers and reinforcing agents may be added to the composition.

The TPUs usable according to the present invention can be prepared by reacting a) organic, preferably aromatic, diisocyanates, in particular 4,4'-diphenylmethane diisocyanate, with b) polyhydroxy compounds, preferably essentially linear polyhydroxy compounds, having molecular weights of from 500 to 8000, in particular polyalkylene glycol polyadipates having from 2 to 6 carbon atoms in the alkylene moiety and molecular weights of from 500 to 6000 or hydroxyl-containing polytetrahydrofuran having a molecular weight of from 500 to 8000, and c) diols as chain extenders having molecular weights of from the 60 to 400, in particular 1,4-butanediol.

in the presence of d) catalysts and optionally e) aids and/or f) additives at elevated temperatures.

Suitable organic diisocyanates for use in the manufacture of these TPUs of the invention are for example aliphatic, cycloaliphatic and preferably aromatic diisocyanates. Specific examples are: aliphatic diisocyanates such as 1,6-hexamethyene diisocyanate, 2-methyl-1×5-pentamethylene diisocyanate, 2-ethyl-1,4-butylene diisocyanate and mixtures of at least two of said aliphatic diisocyanates, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate and the corresponding isomeric mixtures, 4,4'-, 2,4'- or 2,2'- or 2,2'-dicyclohexylmethane diisocyanate and the corresponding isomeric mixtures and preferably aromatic diisocyanate such as 2,4-toluylene diisocyanate, mixtures of 2,4- and 2,6-toluylene diisocyanate, 4,4'-,2,4'- and 2,2'-diphenylmethane diisocyanate, mixtures of 2×4'- and 4×4'-diphenylmethane diisocyanate, urethane-modified liquid 4,4'- and/or 2,4'-diphenylmethane diisocyanates, 4,4'-diisocyanato-1,2-diphenylethane, mixtures of 4,4'-2,4- and 2,2'-diisocyanato-1,2-diphenylethane, preferably those having a 4,4'-diisocyanato-1,2-diphenylethane content of at least 95% by weight, and 1,5-naphthalene diisocyanate. Preference is given to using diphenylmethane diisocyanate isomer mixtures having a 4,4'-diphenylniethane diisocyanate content of greater than 96% by weight and in particular essentially pure 4,4'-diphenylmethane diisocyanate.

Preferred polyhydroxy compounds having molecular weights of from 500 to 8000 are polyetherols and in particular polyesterols. However, it is also possible to use other hydroxyl-containing polymers containing ether or ester groups as bridge members, for example polyacetals, such as polyoxymethylenes and in particular water-soluble formulas, e.g. polybutanediol formal and polyhexanediol formal, and polycarbonates, in particular those formed from diphenyl carbonate and 1,6-hexanediol, Prepared by transesterification. The polyhydroxy compound must be at least predominantly linear, i.e., difunctional within the meaning of the isocyanate reaction. The polyhydroxy compounds mentioned may be used as individual components or in the form of mixtures.

Suitable polyetherols can be prepared from one or more alkylidene oxides having from 2 to 4 carbon atoms in the alkylene moiety in a conventional manner, for example by anionic polymerization with alkali metal hydroxides, such as sodium hydroxide or potassium hydroxide, or alkali metal alcoholates, such as sodium methoxide, sodium ethoxide, potassium ethoxide or potassium isopropoxide, as catalysts and in the presence of at least one initiator molecule which contains 2 to 3, preferably 2 reactive hydrogen atoms, or by cationic polymerization with Lewis acids, such as antimony pentachloride, boron fluoride etherate, etc. or bleaching earth, as catalysts.

Preferred alkylene oxides are for example tetrahydrofuran, 1,3-propylene oxide, 1,2-butylene oxide, 2,3-butylene oxide and in particular ethylene oxide and 1,2-propylene oxide. The alkylene oxides may be used individually, alternately in succession or as mixtures. Suitable initiator molecules are for example: water, organic dicarboxylic acids, such as succinic acid, adipic acid and/or glutaric acid, alkanolamines, such as ethanolamine, N-alkylalkanolamines, N-alkyldialkanolamines, e.g. N-methyl- and N-ethyl-diethanolamine, and preferably dihydric alcohols which may contain ether linkages, e.g. ethanediol, 1,2-propanediol, 1,3-propanediol, 1,4-butanediol, diethylene glycol, 1,5-pentanediol, 1,6-hexanediol, dipropylene glycol, 2-methyl-1,5-pentaniediol and 2-ethyl-1,4-butanediol. The initiator molecules may be used individually or as mixtures.

Preference is given to using polyetherols from 1,2-propylene oxide and ethylene oxide in which more than 50%, preferably from 60 to 80%, or the OH groups are primary hydroxyl groups and where at least some of the ethylene oxide units are present as a terminal block. Such polyetherols can be obtained by, for example, polymerizing onto the initiator molecule first the 1,2-propylene oxide and then the ethylene oxide, or first the entire 1,2-propylene oxide mixed with some of the ethylene oxide aind then the remainder of the ethylene oxide, or step by step first some of the ethylene oxide, then the entire 1,2-propylene oxide and then the remainder of the ethylene oxide,. Other preferred possibilities are the hydroxyl-containing polymerization products of tetrahydrofuran.

The essentially linear polyetherols have molecular weights of from 500 to 8000, preferably from 600 to 6000, in particular from 800 to 3500, the polyoxytetramethylene glycols preferably having molecular weights of from 500 to 2800. They can be used not only individually but also in the form of mixtures with one another.

Suitable polyesterols may be prepared for example from dicarboxylic acids of from 2 to 12, preferably from 4 to 6, carbon atoms and polyhydric alcohols. Suitable dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic acid, glutaric acid and adipic acid. To prepare the polyesterols it may be advantageous to use instead of the dicarboxylic acids the corresponding dicarboxylic acid derivatives, such as dicarboxylic monoesters or diesters having from 1 to 4 carbon atoms in the alcohol moiety, dicarboxylic anhydrides or dicarbonyl dichlorides. Examples of polyhydric alcohols are glycols of from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the properties which are desired, the polyhydric alcohols may be used alone or optionally mixed with one another.

It is also possible to use esters of carbonic acid with the diols mentioned, in particular those having from 4 to 6 carbon atoms, such as 1,4-butanediol and/or 1,6-hexanediol, condensation products of ω-hydroxycarboxylic acids, e.g. ω-hydroxycaproic acid, and preferably polymerization products of lactones, for example substituted or unsubstituted ω-caprolactones.

Preferred polyesterols are ethanediol polyadipates, 1,4-butanediol polyadipates, ethanediol/1,4-butanediol polyadipates, 1,6-hexanediol/neopentylglycol polyadipates, 1,6-hexanediol/1,4-butanediol polyadipates and polycaprolactones.

The polyesterols have molecular weights of from 500 to 6000, preferably from 800 to 3500.

Suitable chain extenders having molecular weights of from 60 to 400, preferably from 60 to 300, are preferably aliphatic diols of from 2 to 12 carbon atoms, preferably of 2, 4 or 6 carbon atoms, e.g. ethanediol, 1,6-hexanediol, diethylene glycol, dipropylene glycol and in particular 1,4-butanediol. However, it is also possible to use diesters of terephthalic acid with glycols of from 2 to 4 carbon atoms, e.g. bisethylene glycol terephthalate, 1,4-butanediol terephthalate, and hydroxyalkylene ethers of hydroquinone, e.g. 1,4-di-(β-hydroxyethyl)-hydroquinone, and also polytetramethylene glycols having molecular weights of from 162 to 378.

To set the hardness index, the formative components can be varied within relatively wide molar ratios bearing in mind that the hardness increases with an increasing level of chain extenders.

To prepare relatively soft TPUs, which are especially preferred for use in the instant invention, for example those having a Shore A hardness of less than 90, it is advantageous to use the essentially difunctional polyhydroxy compounds (b) and the diols (c) in a molar ratio of from 1:0.1 to 1:4.5, preferably from 1:0.5 to 1:4.0, so that the resulting mixtures of (b) and (c) have a hydroxy equivalent weight of greater than 200, in particular form 239 to 450, while greater than 200, in particular form 239 to 450.

Suitable catalysts, in particular for the reaction between the NCO groups of the diisocyanates (a) and the hydroxyl groups of the formative components (b) and (c), are the customary tertiary amines, such as triethylamine, dimethylcyclohexiflamine, N-methylmorpholine, N,N'-dimethylpiperazine, diazabicyclo[2.2.-2] octane and the like, in particular organic metal compounds such as titanic esters, iron compounds, tin compounds, e.g. tin diacetate, tin dioctoate, tin dilaurate or the tin dialkyl salts of aliphatic carboxylic acids such as dibutyltin diacetate, dibutyltin dilaurate and the like. The catalysts are customarily used in amounts of from 0.001 to 0.1 parts by weight per 100 parts by weight of the mixture of polyhydroxy compounds and diols.

In addition to catalysts, the formative TPU components may also contain aids and/or additives. Examples are lubricants, inhibitors, stabilizers against hydrolysis, flame retardants, dyes, pigments, inorganic and/or organic fillers and reinforcing agents.

To prepare the TPUs, the formative components, i.e., diisocyanate compound, polyhydroxy compound, and one or more chain extenders, are made to react in the presence of a catalyst and in the presence or absence of aids and/or additives in such amounts that the equivalence ratio of the diisocyanate NCO groups to the total number of hydroxyl groups of the polyhydroxy and chain extender compounds is from 0.95 to 1.10:1, preferably 0.98 to 1.08:1, in particular approximately 1.0 to 1.05:1.

The TPUs which are usable according to the present invention and which customarily contain from 8 to 20% by weight, preferably from 8 to 16% by weight, based on the total weight, of urethane groups and have a melt flow index at 190° C. under 21.6 kgs of from 1 to 500, preferably from 1 to 200, can be prepared by the extruder technique or the belt technique by batch wise or continuous mixing of components, reacting the mixture in an extruder or on a support belt at from 60° to 250° C., preferably at from 70° to 150° C., and then granulating the resulting TPUs. The reactor extruder technique, such as is well known in the art is most preferred. It may be advantageous to heat the resulting TPU at from 80° to 120° C., preferably at from 100° to 110° C., for a period of from 1 to 24 hours before further processing.

The one or more acrylate based rubbers of the composition generally comprise a terpolymer. An example of an illustrative commercially available material is Goodyear Chemicals' Sunigum®[1].

[1] Sunigum® is a registered trademark of Goodyear Chemical

One or more UV stabilizers may be used as additives which will preferentially absorb and dissipate energy by relieving excited molecules of excess energy and releasing it as heat. In general, the stabilizers preferred for use herein will be effective in the range of from 300 to 360 nm. An example of suitable UV and heat stabilizers are derivatives of o-hydroxybenzophenone, o-hydroxyphenyl salicylates, 2-(o-hydroxyphenyl)-benzotriazoles, and hindered phenols.

It has been found that the particular UV stabilizer compositions of the claimed invention surprisingly confer heat stability without the dulling and yellowing found in many prior art UV-stabilized compositions.

Also suitable for use herein as UV stabilizers are hindered amine light stabilizers. Preferred UV stabilizers are those having active ingredients which are sterically hindered benzotriazol type stabilizers. It will be appreciated that many UV stabilizers are concentrates containing other materials in addition to the active ingredient. Particularly preferred active ingredients for use as UV stabilizers are 2-(2-hydroxy-3,5-di-tert-amyl-phenyl)-2H-benzotriazole, 1,6-hexanediylbis(3-benzotriazol-N-yl)-4-hydroxy-5-tert-butyl) phenyl propionate, and mixtures thereof.

In particular, the most preferred one or more UV stabilizers for use in the instant invention will be stabilizer concentrates containing the aforementioned most preferred active ingredients. Such stabilizer concentrates will preferably further contain thermoplastic polyurethanes (TPU) and 1,3,5-triglycidyl-isocyanurate. Such UV stabilizer concentrates are discussed in DE 4211335 A, the disclosure of which is herein incorporated by reference. The most preferred UV stabilizer concentrates will contain approximately 40 to 80 weight percent of thermoplastic polyurethanes, 10 to 30 weight percent 1,3,5-triglycidyl-isocyanurate and 10 to 30 weight percent 2-(2-hydroxy-3,5-di-tert-amyl-phenyl)-2H-benzotriazole, 1,6-hexanediylbis(3-benzotriazol-N-yl)-4-hydroxy-5-tert-butyl) phenyl propionate, and mixtures thereof.

In addition, the thermoplastic polyurethane compositions of the invention may further optionally contain one or more compatibilizing polymers. Such compatibilizing polymers are generally comprised of copolymers formed from styrene, alpha-methylstyrene, acrylonitrile, methacrylonitrile, butadiene, acrylate, and mixtures thereof. Preferred compatibilizers are poly(styrene-acrylonitrile) and ABS. Especially preferred is poly(styrene-acrylonitrile).

Finally, the thermoplastic polyurethane compositions of the invention may further optionally contain additives selected from the group consisting of lubricants, inhibitors, stabilizers against hydrolysis, flame retardants, dyes, pigments, inorganic and/or organic fillers and reinforcing agents. Particularly preferred additives are dyes and pigments. Titanium dioxide is a commonly used pigment. Of course, those skilled in the art will appreciate that the incorporation of such dyes and pigments depends upon the desired appearance of the end use application.

With respect to the foregoing components of the thermoplastic polyurethane compositions of the invention, such compositions will preferably contain from 50 to 100% of one or more thermoplastic polyurethanes, from greater than 10 to 49% of one or more acrylate based rubbers, and from 0.1 to 5.0% of active ingredients of one or more UV stabilizers, as based on the total combined weight of the components.

More preferably, the thermoplastic polyurethane compositions of the invention will contain from 60 to 80% of one or more thermoplastic polyurethane, from greater than 20 to 40% of one or more acrylate based rubbers, and from 1.0 to 4.0% of active ingredient of one or more UV stabilizers, as based on the total combined weight of the components.

If the thermoplastic polyurethane composition of the invention also comprises a compatibilizing polymer, such polymer should be present in an amount of from 1 to 10% as based on the total weight of the combined components. More preferably, the thermoplastic polyurethane composition comprising a compatibilizing polymer will contain less than 5% of the polymer, and most preferably, will comprises from 2 to 4% of compatibilizing polymer. It will be appreciated that additives will be present in amounts dependent upon the desired end properties of the composition.

It will be appreciated that in the instant invention, the thermoplastic polyurethane composition is a blend wherein the predominant matrix is comprised of thermoplastic polyurethane. Dispersed in said matrix are particles of one or more acrylate based rubbers. If present, compatibilizing polymer will serve as the interface between said acrylate based rubber particles and the TPU matrix. Also interspersed within the matrix TPU will be UV stabilizers.

The rigid thermoplastic material of the claimed article comprises nylon. As used herein, the term "nylon" is a generic term for any long-chain synthetic polymeric amide which has recurring amide groups as an integral part of the main polymer chain.

Certain nylons are identified by the number of carbon atoms in the diamine and dibasic acid used to produce them; thus, e.g., nylon 6/6 is a polymer produced by the condensation of hexamethylene diamine and adipic acid. Some nylons are produced by the condensation of only one reactive species, and they are generally produced from a lactam. These latter class of nylons are usually identified by the number of carbon atoms in the monomer used to produce them, thus, e.g., poly(aminocaproic acid) is produced by the polymerization of caprolactam, and it is referred to as "nylon 6".

Examples of nylons (polyamides) that may be used in the article and process of the invention include, without limitation, nylon-6; nylon-6,6; nylon-6,10; nylon-4,6; nylon-6,12; nylon-11; nylon-12; partially aromatic nylon copolymers such as nylon-6/6,T; nylon-6,6/6, I/6,T; and so on, and blends of these. Suitable nylons are available from BASF Corporation, Mount Olive, N.J. under the tradename Ultramid®. Preferred among these are nylon-6 and nylon-6,6. The nylons that are used in the invention have number average molecular weights of preferably at least about 10,000 and more preferably at least about 15,000. The number average molecular weights of preferred nylons may be up to about 40,000 and particularly up to about 20,000.

A nylon resin is included in the nylon material of the invention in an amount of at least about 40 percent, preferably at least about 50 percent, and even more preferably at least about 60 percent, based on the weight of the compounded nylon material. The nylon resin is also included in the nylon material in an amount of up to about 90 percent, preferably up to about 80 percent, and even more preferably up to about 70 percent, based on the weight of the compounded nylon material.

The nylon material of the invention may also comprise a reinforcing agent that may be a fibrous material or a mineral reinforcing agent. Useful fiber reinforcements include, without limitation, glass fibers, carbon and graphite fibers, polymeric fibers including aramide fibers, boron filaments, ceramic fibers, metal fibers, asbestos fibers, beryllium fibers, silica fibers, silicon carbide fibers, and so on. The fibers may be conductive and such conductive fibers, for example, conductive carbon fibers or metal fibers, may be used to produce articles for conductive or static charge dissipative applications or EMI shielding. Among these, glass fibers, carbon fibers, and aramide fibers are preferred. Methods of preparing thermoplastic resins that include such fibers are well known in the art. In one method, chopped glass fiber bundles are fed into the melting zone of the extruder that is being used to form the reinforced nylon material. Alternatively, the fiber is introduced as a continuous tow or bundle into a port in the extruder.

The reinforcing agent of the invention may also comprise a mineral reinforcing agent. Suitable mineral reinforcing agents include, without limitation, wollastonite, micas, glass beads (solid or hollow), kaolin, and talc. Micas may be treated, for example, with coupling agents such as silanes to improve mechanical properties or with a nickel coating for special applications. Preferred mineral reinforcing agents are wollastonite, mica, kaolin, and talc. Mineral reinforcing agents are typically incorporated into the resin by feeding through a hopper into a melt zone of the extruder.

The reinforcing agent may be, and in many cases is preferred to be, a combination of reinforcing fibers and reinforcing minerals. For example, in one preferred embodiment, the reinforcing agent is a combination of glass fibers and wollastonite. The reinforcing agent or agents are included in amounts of at least about 5 percent, preferably at least about 15 percent, and even more preferably at least about 25 percent, based on the weight of the compounded resin. The reinforcing agent or agents are included in amounts of up to about 70 percent, preferably up to about 60 percent, and even more preferably up to about 50 percent, based on the weight of the compounded resin. Typically, about 25 percent to about 60 percent reinforcing agent is included in the compounded nylon.

Heat stabilizers suitable for addition to the nylon material of the invention should be hindered phenols and phosphites. Copper iodide or other stabilizers that would color the materials are not preferred.

The nylon materials may also include at least one further additive. Examples of suitable additives include, without limitation, plasticizers; thixotropes; optical brighteners; antioxidants; UV absorbers and hindered amine or hindered amide light stabilizers; flame retardants; pigments and colorants; processing aids such as lubricants, mold release agents, and slip agents; fragrances; antifoaming agents; antioxidants; antistatic agents; antimicrobials; biocides; and so forth. Impact modifiers such as ionomers, maleated elastomers, and natural and synthetic rubber particles and other materials that would tend to form discreet phases are not preferred.

The nylon composition may include one or more pigments or colorants. Preferably, the pigment is present in an amount of up to about 4 percent by weight, and especially up to about 2 percent by weight, based on the weight of the weight of the sin. Suitable pigments are black, white, or color pigments. Examples of useful pigments include, without limitation, titanium dioxide, zinc oxide, zinc sulfide carbon black, black iron oxide, copper chromite black, yellow iron oxides, red iron oxides, brows iron oxides, ocher, sienna, umber, hematite, limonite, mixed iron oxides, chromium oxide, Prussian blue (ammonium ferrocyanide), chrome green, chrome yellow, manganese violet, cobalt phosphate, cobalt lithium phosphate, ultramarines, blue and green copper phthalocyanines, metallized and nonmetallized azo reds, gold, red and purple quinacridones, mono- and diarylide yellows, naphthol reds, pyrrolo-pyrroles, anthraquinones, thioindigo, flavanthrone, and other vat pigments, benzimidazolone-based pigments, dioxazine, perylenes, carbazole violet, perinone, isoindoline, and so on.

Dyes may be employed instead of a pigment or in addition to a pigment. For example, a dye may be used to produce a brighter color than would otherwise be obtained with a composition containing only pigments. Examples of useful dyes include, without limitation, azo dyes, such as Solvent Yellow 14 and Metanil Yellow; anthraquinone dyes, such as Solvent Red 111, Solvent Blue 56, and Solvent Green 3; xanthene dyes, such as Rhodamine B, Sulfo Rhodamine, Solvent Green 4, Acid Red 52, Basic Red 1, and Solvent Orange 63; azine dyes, such as induline and nigrosines; fluorescent dyes, Brilliant Sulfoflavine (Acid Yellow 7), Solvent Orange 60 (a perinone dye), basic triphenylmethane dyes, such as methyl violets and Victoria Blue B, and quinoline yellows.

Conductive materials include conductive pigments, such as certain grades of carbon black and graphite. The carbon black may function as both a conductive material and a colorant. Such conductive materials may be incorporated into the coating composition according to usual methods of incorporating fillers or pigments, which will now be generally described with particular reference to pigments.

The dry pigment may be added, preferably along with the resin, during compounding of the reinforced nylon material, or may be predispersed in a carrier resin before compounding. The pigment may be dispersed in a carrier resin component, which is preferably a hydrophobic resin component, by a two-step process. In a first step, the pigment agglomerates are broken into smaller particles. In a second step, the air at the surface of the pigment particles is displaced with resin to "wet out" the pigment and thereby fully develop its color shade and strength. One method of dispersing the pigment in the carrier resin component is to first tumble the pigment with granules of the resin and then obtain an intimate mixture by processing the tumbled blend in a roller mill, Banbury mixer, intensive mixer, or single- or twin-screw extruder. The resin component is advantageously selected for its ability to disperse a high loading of pigment and for easy handling.

The dispersed colorant may be, for example, a conventional color concentrate or a liquid color. Typical color concentrates may include one or more thermoplastic resins and one or more pigments. Examples of suitable thermoplastic resins include, without limitation, waxes, polyolefins, nylon homopolymers and copolymers, arid styrene-based polymers. Suitable waxes include naturally occurring waxes such as animal waxes, vegetable waxes, mineral waxes, and petroleum waxes, as well as synthetic waxes. Preferred among these are hydrocarbon waxes, such as paraffin waxes; polyalkylene homopolymers and copolymers, especially polyethylene, polypropylene, and copolymers of alkenes having 2 to 10 carbon atoms, particularly copolymers of ethylene with alkenes having from 3 to 10 carbon atoms, especially copolymers with propylene or butylene'microcrystalline waxes; carnuba waxes; montan waxes; Fischer-Tropsch waxes; fatty alcohols; derivatives of fatty acids, especially those having from about 12 to about 18 carbon atoms, including stearic acid, palmitic acid, lauric acid, myristic acid, oleic acid, linoleic acid, and tall oil fatty acid, such derivatives including fatty amides and esters of fatty acids; hydrogenated oils, such as hydrogenated castor oil; polyethers, including polyalkylene glycols such as polyethylene glycol, polypropylene glycol, and block copolymers of these; polytetrahydrofuran; and mixtures of these. Particularly preferred waxes are polyethylene waxes having molecular weights of preferably at least 2000 and preferably below about 12,000; carnuba waxes; esters of fatty acids; montan waxes, and mixtures of these. The pigment may be any of those known in the art, such as those listed hereinabove, and mixtures of such pigments. Conventional color concentrates may be in the form of pellets, cubes, beads, wafers, or microbeads. Color concentrates may have a pigment loading of from about 10 percent by weight to about 80 percent by weight, typically from about 30 percent by weight to about 60 percent by weight, based upon the weight of the color concentrate. Preferably, the color concentrate has a pigment loading of up to about 80 percent by weight, and preferably at least about 50 percent by weight, based upon the weight of the color concentrate. The pigment concentration will vary, depending upon the selection of pigment and carrier. Liquid colors typically have pigment loadings of from about 10 percent up to about 80 percent.

Alternatively, two or more color concentrates or pigments may be added to the nylon reinforced material during compounding to obtain the desired color. Pigments and color concentrates are readily commercially available from a number of companies, including BASF Corporation, Mount Olive, N.J.; Cabot Corporation, Waltham, Mass.; Degussa AG, Frankfurt, Germany; Reed Spectrum, Holden, Mass.; Unifor Color Company, Holland, Mich.; Americhem Inc., Cuyahoga Falls, Ohio; and Holland Colors Americas Inc., Richmond, Ind.

The nylon and thermoplastic polyurethane materials above are combined together in a melt process, preferably using a twin-screw extruder. The combinedl hard/soft article is produced by melt forming one of the components into the desired shape, followed by introduction of the molten second component over the first. Preferred methods include 1) overmolding, i.e., molding the rigid thermoplastic first, allowing to cool and then molding a layer of the TPU compound on top of it; 2) co-injection molding, i.e., melt streams of the two materials are injected into a mold cavity, forming a core shell structure without interlayer mixing; 3) co-extrusion; 4) extrusion coating; 5) blowing molding; and 6) thermoforming. Prefereably, the molding process will be carried out it a temperature of from about 190 to about 230° C.

Molded thermoplastic polyurethane articles of the invention may be made by introducing the compositions disclosed herein into a mold such as those known to those skilled in the art and subjecting the composition to processing temperatures such as those disclosed above. The composition will be maintained in the mold subject to said elevated heating conditions for a time sufficient to result in a molded article.

In general, the nylon thermoplastic material of the invention will have a Shore hardness ranging from about M 60 to about M 110 on the Rockwell hardness scale. The hardness of a nylon depends on the type of nylon; the additives in the nylon, for example, nucleating agents, plasticizers, glass fibers, etc.; and the moisture content of the nylon, as shown in the *Nylon Plastics Handbook*, Melvin Kohan, 1995 Hanser, the disclosure of which is incorporated herein by reference.

EXAMPLE 1

A variety of commercial and experimental thermoplastic elastomers (TPEs) were "over-molded" on Ultramid® B3ZG6 plaques, and their adhesive strengths were testing using a 180° peel test. The results are contained in table 1.

TABLE 1 results of a 180° peel test on TPU-overmolded plaques of Ultramid B3ZG6.

| Thermoplastic Elastomer | Description | Shore A hardness | Processing Temp. [° C.] | peel strength, [kN/m] |
|---|---|---|---|---|
| 1) Zytel FN 714 | PA 66-ethylene copolymer blend | 95 | 287 | 1.05 |
| 2) Pebax 2533 | Polyether-block polyamide | 75 | 204 | 0.27 |
| 3) Lext 2416 | PA 6 - vulcanized rubber blend | 85 | 237 | 0.23 |
| 4) Elastollan C78A-15 | TPU - ester based | 78 | 193 | 1.52 |

TABLE 1-continued results of a 180° peel test on TPU-overmolded plaques of Ultramid B3ZG6.

| Thermoplastic Elastomer | Description | Shore A hardness | Processing Temp. [° C.] | peel strength, [kN/m] |
|---|---|---|---|---|
| 5) Elastollan C60A-10WN | TPU - ester based + phthalate plasticizer | 60 | 193 | 1.84 |
| 6) Elastollan (*) LJ31/122/A | TPU - ether based + rubber | 67 | 180 | 2.91 |
| 7) Elastollan (*) LP9156 | TPU - ether based + rubber | 80 | 180 | 3.00 |

Ultramid ® B3ZG6 is a 30% glass-reinforced and impact-modified nylon 6, available from BASF Corp., Mt. Olive, NJ
1) Zytel FN 714 is available from DuPont, Wilmington DE
2) Pebax 2533 is available from Elf-Atochem, Philadelphia, PA
3) Lext available from Advanced Elastomeric Systems, Inc., Akron OH
4) Elastolan C78A-15 available from BASF Corp., Mt. Olive, NJ
5) Elastolan C60A-10WN available from BASF Corp., Mt. Olive, NJ
6) Elastolan LJ31/122/A available from BASF Corp., Mt. Olive, NJ
7) Elastolan LP9156 available from BASF Corp., Mt. Olive, NJ The Elastollan® LP9156 and LJ 31/122/A products represent the thermoplastic polyurethanes of the invention, while the C60A-10WN and C78A-15 products are conventional thermoplastic polyurethanes. All of the thermoplastic polyurethane products used in the example are available from BASF Corporation, Mount Olive, N.J. under the tradename Elastollan®.

The best results were obtained with the thermoplastic polyurethanes of the invention:

Elastollan® LP9156 (peel strength=3.00 kN/m), followed by

Elastollan® LJ31/122/A (2.91 kN/m),

Elastollan® C60A-10WN (1.84 kN/m), and

Elastollan® C78A-15 (1.52 kN/m).

All other materials tested: Zytel® FN (Zytel® is a registered trademark of E.I. duPont de Nemours), Peebax® (Peebax® is a registered trademark of Elf-Atochem), and Lext® (Lext® is a registered trademark of AES) showed minimal adhesion to nylon under the conditions used.

The results of the peel test showed that, generally, materials with good adhesion also displayed the greatest displacement, due to stretching/elongation of the elastomeric layer. The TPUs of the invention outperformed all other materials. Because of their good adhesion, good thermal aging resistance, abrasion resistance and low Shore hardness without the use of plasticizers, the two Elastollan® urethanes (LP31/122/A and LP9156) most successfully overmolded the nylon.

We claim:

1. An article of manufacture comprising:
   (A) a thermoplastic material layer comprised of nylon, wherein said thermoplastic material layer has a Rockwell hardness of from about M60 to about M110; and
   (B) a thermoplastic polyurethane blend layer which is capable of adhering to said thermoplastic material layer, wherein said thermoplastic polurethane blend layer comprises a thermoplastic polyurethane composition comprised of:
   1) 3 to 200 parts by weight of a terpolymer of styrene/ α-methylstyrene/acrylonitrile/$C_1$–$C_6$ alkyl acrylate with a glass transition temperature (Tg) below 0° C.; and
   2) 100 parts by weight of a thermoplastic polyurethane produced from a diisocyanate, a $C_2$–$C_{10}$ diol, and a polyether polyol and/or polyester polyol wherein said thermoplastic polyurethane layer has a Shore A hardness of from about 65 to about 90; and wherein the thermoplastic polyurethane blend layer is bonded to the thermoplastic material layer.

2. The article of claim 1, wherein the article is selected from the group consisting of power tool housings, luggage handles, gear shifts and automotive pedals.

3. The article of claim 1 wherein the thermoplastic polyurethane blend layer is attached to the thermoplastic material layer by means of a process selected from the group consisting of overmolding, co-injection molding, co-extrusion, extrusion coating, blowing molding and thermoforming.

4. The article of claim 3, molded at a temperature of from about 190 to about 230 degrees C.

5. The article of claim 1, wherein the thermoplastic polyurethane blend further comprises one or more compatibilizing polymers.

6. The article of claim 5 wherein the compatibilizing polymer is from 1 to 10%, by weight, based on the total weight of components in the thermoplastic polyurethane blend.

7. The article of claim 6 wherein the compatibilizing polymer is from 1 to 5% by weight, based on the total weight of components in the thermoplasic polyurethane blend.

8. The article of claim 7 wherein the compatibilizing polymer is from 1 to 4%, by weight, based on the total weight of components in the thermoplastic polyurethane blend.

9. The thermoplastic polyurethane composition of claim 5 wherein the compatibilizing polymer is an acrylonitrile/ styrene copolymer.

10. The article of claim 1, wherein the thermoplastic polyurethane composition is prepared using polyhydroxy compounds selected from the group consisting of polyetherols and polyesterols.

11. The article of claim 10, wherein the thermoplastic polyurethane composition is prepared using polyetherols.

12. The article of claim 1, wherein the thermoplastic polyurethane composition is prepared using aromatic isocyanates.

13. The article of claim 1, where in the thermoplastic polyurethane is prepared using diphenylmethane diisocyanate.

14. The article of claim 1, wherein the thermoplastic polyurethane blend further comprises a UV stabilizer comprised of one or more materials having an active ingredient selected from the group consisting of benzotriazole stabilizers and hindered phenol stabilizers.

15. The article of claim 14, wherein the UV stabilizer comprises an active ingredient which is selected from the group consisting of 2-(2-hydroxy-3,5-di-tert-amyl-phenyl)- 2H-benzotriazole, 1,6-hexanediylbis(3-benzotriazol-N-yl)- 4-hydroxy-5-tert-butyl) phenyl propionate and mixtures thereof.

16. The article of claim 1, wherein the nylon is selected from the group consisting of nylon 6/6, nylon 6, nylon 6/10, nylon 6/12, nylon 4/6, nylon 11, nylon 12, glass reinforced nylon and mineral reinforced nylon.

17. The article of claim 16, wherein the nylon further comprises a reinforcing agent selected from the group consisting of glass fibers, carbon and graphite fibers, aramide fibers, boron filaments, ceramic fibers, metal fibers, asbestos fibers, beryllium fibers, silica fibers, silicon carbide fibers, wollastonite, micas, glass beads, kaolin and talc.

18. The article of claim 17, wherein the reinforcing agent comprises from about 5 to about 70 percent by weight of the nylon.

19. The article of claim 18, wherein the reinforcing agent comprises from about 15 to about 60 percent by weight of the nylon.

20. The article of claim 19, wherein the reinforcing agent comprises form about 25 to about 50 percent by weight of the nylon.

21. The article of claim 16, wherein the nylon further comprises an additive selected form the group consisting of plasticizers; thixotropes; optical brighteners; antioxidants; UV absorbers; hindered amine or hindered amide light stabilizers; flame retardants; pigments; colorants; lubricants mold release agents, slip agents; fragrances; antifoaming agents; antioxidants; antistatic agents; impact modifiers; antimicrobials and biocides.

22. The article of claim 16, wherein the nylon further comprises a color pigment present in an amount of up to about 4 percent by weigth of the nylon.

23. The artcle of claim 22, wherein the pigment is selected from the group consisting of titanium dioxide, zinc oxide, zinc sulfide carbon black, black iron oxide, copper chromite black, yellow iron oxides, red iron oxides, brown iron oxides, ocher, sienna, umber, hematite, limonite, mixed iron oxides, chromium oxide, Prussian blue (ammonium ferrocyanide), chrome green, chrome yellow, manganese violet, cobalt phosphate, cobalt lithium phosphate, ultramarines, blue and green copper phthalocyanines, metallized and nonmetallized azo reds, gold, red and purple quinacridones, mono- and diarylide yellows, naphthol reds, pyrrolo-pyrroles, anthraquinones, thioindigo, flavanthrone, benzimidazolone-based pigments, dioxazine, perylenes, carbazole violet, perinone and isoindoline.

24. The article of claim 22, further comprising a dye selected from the group consisting of azo dyes, anthraquinone dyes, xanthene dyes, azine dyes, fluorescent dyes and basic triphenylmethane dyes.

25. The article of claim 16, further comprising a dye selected from the group consisting of azo dyes, anthraquinone dyes, xanthene dyes, azine dyes, fluorescent dyes and basic triphenylmethane dyes.

26. The article of claim 1, wherein the nylon further comprises an additive selected from the group consisting of lubricants, inhibitors, stabilizers against hydrolysis, heat stabilizers, flame retardants, dyes, pigments, inorganic fillers, organic fillers, impact modifiers and reinforcing agents.

* * * * *